(12) United States Patent
Oda (10) Patent No.: US 11,041,804 B2
(45) Date of Patent: Jun. 22, 2021

(54) DIFFERENTIAL REFRACTOMETER (71) Applicant: SHIMADZU CORPORATION, Kyoto (JP)

(72) Inventor: Ryutaro Oda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/650,529

(22) PCT Filed: Jul. 12, 2018

(86) PCT No.: PCT/JP2018/026272
§ 371 (c)(1),
(2) Date: Mar. 25, 2020

(87) PCT Pub. No.: WO2019/069527
PCT Pub. Date: Apr. 11, 2019

(65) Prior Publication Data
US 2020/0278291 A1    Sep. 3, 2020

(30) Foreign Application Priority Data

Oct. 4, 2017 (JP) .............................. JP2017-194582

(51) Int. Cl.
G01N 21/41    (2006.01)
(52) U.S. Cl.
CPC . G01N 21/4133 (2013.01); G01N 2021/4146 (2013.01)
(58) Field of Classification Search
CPC ....... G01N 21/4133; G01N 2021/4146; G01N 2021/4153; G01N 21/05
See application file for complete search history.

(56) References Cited

U.S. PATENT DOCUMENTS

2005/0168726 A1* 8/2005 Larkin ............... G01N 21/4133
356/130

FOREIGN PATENT DOCUMENTS

JP    2010-048642 A    3/2010

OTHER PUBLICATIONS

International Search Report with respect to International Patent Application No. PCT/JP2018/026272, dated Oct. 9, 2018.
Written Opinion of the International Searching Authority with respect to International Patent Application No. PCT/JP2018/026272, dated Oct. 9, 2018 (English Machine Translation).

* cited by examiner

Primary Examiner — Hwa Andrew Lee
(74) Attorney, Agent, or Firm — Renner, Otto, Boisselle & Sklar, LLP (57) ABSTRACT A plurality of light-receiving elements that are arranged in two rows are provided on a light-receiving surface of a detector. A slit image formed on this detector. One group of a plurality of the light-receiving elements are arranged consecutively in a displacement direction of the slit image to form a row (one light-receiving elements row), and another group of a plurality of the light-receiving elements are also arranged consecutively in the displacement direction of the slit image to form a row (another light-receiving elements row). The one light-receiving elements row and the other light-receiving elements row are in contact with each other.

4 Claims, 10 Drawing Sheets

DIFFERENTIAL REFRACTOMETER

TECHNICAL FIELD

The present invention relates to a differential refractometer that is used as a detector of a liquid chromatograph, for example.

BACKGROUND ART

The principle of the differential refractometer will be described. The differential refractometer irradiates a flow cell with light from a light source, and detects the light that has been transmitted through the flow cell using a detector. The flow cell includes a sample cell through which a sample solution flows and a reference cell for a reference solution with a partition wall provided therebetween, and is arranged such that the light from the light source is transmitted through the sample cell and the reference cell to be led to the detector (See Patent Document 1).

The light that has been transmitted through the flow cell is led onto a photoelectric conversion element such as a photodiode provided as a detector, and forms a slit image. The measurement light with which the flow cell is irradiated is refracted in the flow cell in a case where the refractive index of the sample solution flowing through the sample cell is different from the refractive index of the reference solution for the reference cell, and the slit image formed on the photoelectric conversion element moves from a predetermined position. The moving distance of the slit image formed on the photoelectric conversion element is determined based on the difference between the refractive index of the sample solution and the refractive index of the reference solution, and the change in refractive index of the sample solution is obtained by measurement of the moving amount of the slit image.

The photoelectric conversion element is constituted by a pair of light-receiving elements that are adjacent to each other, and detects the moving amount of the slit image based on the difference between the output currents of these two light-receiving elements. That is, in a case where the light from the light source is transmitted through the flow cell without being refracted, the slit image is formed at the boundary between the two light-receiving elements, and the output currents of the two light-receiving elements are adjusted to be equal to each other. In a case where the light from the light source is refracted in the flow cell, and the slit image is ward any of the light-receiving elements accordingly, the difference between the output currents of the two light-receiving elements is generated correspondingly to the displacement amount. Thus, the displacement amount of the slit image is obtained by calculation of the difference between the output currents of the two light-receiving elements, so that the change in refractive index in the flow cell can be obtained. The relationship between the change in refractive index in the flow cell and the concentration of the sample solution flowing through the sample cell is associated with the calibration curve, or the like obtained by an experiment in advance. Thus, in a case where the difference between the detection signals of the two light-receiving elements is calculated, the concentration of the sample solution can be determined.

[Patent Document 1] JP 2010-48642 A

SUMMARY OF INVENTION

Technical Problem

In the above-mentioned configuration of the photoelectric conversion element, the displacement amount of the slit image can be detected when the slit image is formed on the boundary between the two light-receiving elements. However, in a case where the slit image is moved away from the boundary between the two light-receiving elements and towards one light-receiving element, the displacement amount of the slit image cannot be obtained. Therefore, with the conventional configuration, the sample having such a high concentration that a slit image is displaced at the position away from the boundary between the two light-receiving elements could not be measured.

One type of liquid chromatograph is for "analysis" and is used to analyze a sample having a low concentration. The other type of liquid chromatograph is for "separation," and uses a sample having a high concentration and collects a necessary component based on a detection signal while detecting components separated in a separation column by a detector. In a case where a differential refractometer that is optimized for "analysis" is used for "separation" in which a sample having a high concentration is used, a change in refractive index of a flow cell is increased, and a slit image is displaced at a position away from the boundary between the two light-receiving elements of the photoelectric conversion element. Thus, the displacement amount cannot be measured. Therefore, it is difficult to use a differential refractometer optimized for "analysis" as a detector for "separation."

An object of the present invention is to provide a differential refractometer that can measure a sample having a low concentration and a sample having a high concentration without lowering detection sensitivity.

Solution to Problem

In the present invention, a differential refractometer includes a light source that generates measurement light, a flow cell that is provided with a sample cell through which a sample solution flows, a reference cell for a reference solution and a partition wall provided between the sample cell and the reference cell, and refracts the light from the light source in a case where a refractive index of the sample cell and a refractive index of the reference cell are different from each other, an optical system that irradiates the flow cell with the measurement light from the light source, causes the measurement light to be transmitted through the sample cell and the reference cell of the flow cell, and causes a slit image of the measurement light that has been transmitted through the flow cell to be formed, and a detector that includes a light-receiving surface at a position at which the slit image of the measurement light that has been transmitted through the flow cell is formed, wherein the differential refractometer is configured such that the slit image is displaced in a certain direction on the light-receiving surface according to a change in refractive index of the sample cell. In the differential refractometer according to the present invention, the detector includes two light-receiving element rows in which a plurality of light-receiving elements are consecutively arranged in a displacement direction of the slit image on the light-receiving surface, a width of the light-receiving element in the displacement direction is larger than a width of the slit image, a boundary between adjacent light-receiving elements in one light-receiving element row is deviated from a boundary between adjacent light-receiving elements in another light-receiving element row and closest to the boundary by a distance smaller than the width of the slit image in the displacement direction, and the slit image is set to be formed and extend to both of light-receiving element rows. Further, the differential refractometer includes a measurement light-receiving element pair selector configured to select a pair of light-receiving elements as a measurement light-receiving element pair, which are adjacent to each other in any one of the light-receiving element rows and has a boundary between the pair of light-receiving elements and on which a slit image is formed, out of the light-receiving elements of the detector, and a calculator configured to acquire detection signals of the measurement light-receiving element pair and obtain a displacement amount of the slit image based on a difference between the detection signals of these light-receiving elements.

Advantageous Effects of Invention

In the differential refractometer of the present invention, the detector includes two light-receiving element rows in which a plurality of light-receiving elements are consecutively arranged in a displacement direction of the slit image on the light-receiving surface, a width of the light-receiving element in the displacement direction is larger than a width of the slit image, a boundary between adjacent light-receiving elements in one light-receiving element row is deviated from a boundary between adjacent light-receiving elements in another light-receiving element row and closest to the boundary by a distance smaller than the width of the slit image in the displacement direction, and the slit image is set to be formed and extend to both of light-receiving element rows. Thus, even in a case where the slit image is displaced beyond the boundary between the adjacent light-receiving elements in the one light-receiving element row, the slit image is positioned on the boundary between the adjacent light-receiving elements in the other light-receiving element row. Therefore, the displacement amount of the slit image can be accurately measured. Therefore, a sample having a higher concentration can be more accurately measured as compared to the conventional case. Further, the differential refractometer includes a measurement light-receiving element pair selector configured to select a pair of light-receiving elements as a measurement light-receiving element pair, which are adjacent to each other in any one of the light-receiving element rows and has a boundary between the pair of light-receiving elements and on which a slit image is formed, out of light-receiving elements of the detector, and a calculator configured to acquire detection signals of the measurement light-receiving element pair and obtain a displacement amount of the slit image based on a difference between the detection signals of these light-receiving elements. Thus, the pair of light-receiving elements having the boundary therebetween on which the slit image is formed is automatically detected, and the displacement amount of the slit image is automatically obtained based on the difference between the detection signals of these light-receiving element pairs.

DESCRIPTION OF EMBODIMENTS

In a differential refractometer according to the present invention, a measurement light-receiving element pair selector may regularly acquire detection signals from all of light-receiving elements of a detector during measurement. In a case where detecting from a detection signal that a slit image is formed on the boundary between a pair of light-receiving elements, that is adjacent to and different from the pair of currently selected light-receiving elements, the measurement light-receiving element pair selector may be configured to set the pair of light-receiving elements as a new measurement light-receiving element pair. Thus, a new pair of light-receiving elements can be selected as a measurement light-receiving element pair before the slit image is further displaced and crosses the boundary between the pair of currently used light-receiving element pairs.

Further, a measurement light-receiving element pair estimator configured to estimate a pair of light-receiving elements to be selected next as a measurement light-receiving element pair based on a change in displacement amount of the slit image over time may be included, the displacement amount being obtained by a calculator during measurement. The measurement light-receiving element pair selector may be configured to regularly acquire detection signals of the pair of light-receiving elements estimated by the measurement light-receiving element pair estimator during measurement, and set the pair of light-receiving elements as a new measurement light-receiving element pair in a case where it is detected from a detection signal that the slit image is positioned on the boundary between the pair of light-receiving elements. Thus, it is unnecessary to regularly acquire and monitor detection signals of all of the light-receiving elements in order to switch measurement light-receiving element pairs, so that a signal process can be simplified.

The calculator is preferably configured to use a value, which is obtained when a difference value between the detection signals of light-receiving elements constituting the measurement light-receiving element pair is divided by an addition value of these detection signals, for calculation of a displacement amount of a slit image. This can eliminate the influence such as a change in amount of light in the light source and the influence caused by a change in amount of light received by a light-receiving element due to absorption of a sample. Thus, the measurement accuracy can be improved, and noise can be reduced.

Figure 1:
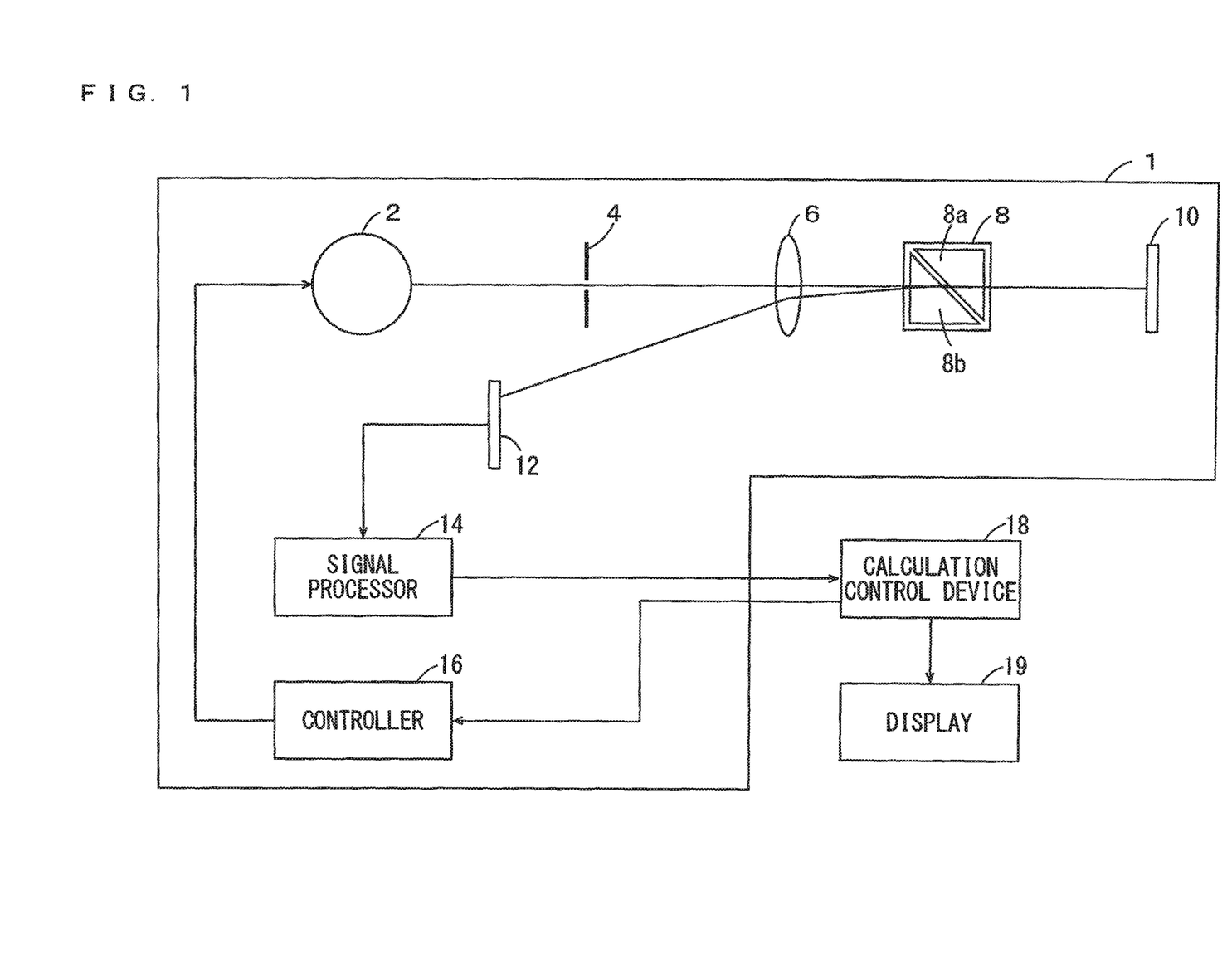
FIG. 1 A diagram schematically showing the configuration of one inventive example of a differential refractometer.

One inventive example of the differential refractometer will be described with reference to FIG. 1.

The differential refractometer of this inventive example is constituted by a detector main body 1 and a calculation control device 18. The calculation control device 18 performs a calculation process based on a signal obtained by the detector main body 1 and displays a calculation result in a display in addition to controlling an operation of the detector main body 1. An operator who operates this differential refractometer inputs information such as measurement conditions by using an input device provided in the calculation control device 18. The calculation control device 18 is realized by a PC (personal computer) or a dedicated computer connected to the detector main body 1 and dedicated software embedded in the PC or the computer, for example.

In the detector main body 1, a light source 2 that emits measurement light, a slit 4, a lens 6, a flow cell 8 and a reflection mirror 10 are arranged in this order from the light source 2 on an optical axis of the measurement light. The slit 4, the lens 6 and the reflection mirror 10 constitute an optical system that irradiates the flow cell 8 with the measurement light from the light source 2, and leads the measurement light that has been transmitted through the flow cell 8 to a detector 12 to form an image of the slit 4 on a light-receiving surface of the detector 12.

The detector main body 1 further includes the detector 12 at a position at which the measurement light reflected from the reflection mirror 10 is received, and includes a signal processor 14 that performs a process of a detection signal acquired by the detector 12 and a controller 16 that controls an operation of the detector main body 1 based on information such as measurement conditions provided by the calculation control device 18.

The flow cell 8 includes a sample cell 8a through which a sample solution flows and a reference cell 8b for a reference solution. While flowing through the reference cell 8b, the reference solution may be stored in the reference cell 8b. The cross sections of the sample cell 8a and the reference cell 8b are triangular and have the same shape, and their respective side surfaces are arranged to be perpendicular to the optical axis of the measurement light emitted from the light source 2. In this inventive example, the flow cell 8 is arranged such that the measurement light enters through the reference cell 8b, and is arranged such that the measurement light exits from the sample cell 8a. However, the positions of the sample cell 8a and the reference cell 8b may be reversed.

The measurement light emitted from the light source 2 is transmitted through the slit 4 and the lens 6, and then the flow cell 8 is irradiated with the measurement light. The measurement light transmitted through the flow cell 8 is reflected from the reflection mirror 10, transmitted through the flow cell 8 again and is concentrated on the detector 12 through the lens 6. Then, an image of the slit 4 (a slit image) is formed on the light-receiving surface of the detector 12. In a case where the sample cell 8a and the reference cell 8b of the flow cell 8 have different light refractive indices, the measurement light is refracted in the flow cell 8. Thus, the slit image formed on the light-receiving surface of the detector 12 of the flow cell 8 is displaced. The detector 12 includes a plurality of light-receiving elements for detecting displacement of the slit image.

The detection signal of the detector 12 is input to the signal processor 14. The signal processor 14 is configured to detect two adjacent light-receiving elements having a slit image formed on the boundary therebetween based on detection signals of the light-receiving elements acquired from the detector 12 and set the two adjacent light receiving elements as a measurement light-receiving elements pair, and is configured to obtain a displacement amount of the slit image formed on the detector 12 and the difference in refractive index between the sample solution and the reference solution in the flow cell 8 using the difference between the detection signals of the measurement light-receiving elements pair. The information in regards to the refractive index of the flow cell 8 obtained by the signal processor 14 is input to the calculation control device 18.

The calculation control device 18 holds a calibration curve which is obtained in advance by an experiment and represents the relationship between the refractive index of the flow cell 8 and the concentration of the sample solution flowing through the sample cell 8a, and includes a program for determining the concentration of the sample solution flowing through the sample cell 8a using the calibration curve based on the information about the refractive index acquired from the signal processor 14. The quantification result of concentration of the sample solution is displayed on the display 19.

The configuration of the detector 12 for measuring the displacement amount of the slit image formed on the detector 12 will be described with reference to FIG. 2. The displacement direction of the slit image 20 is the left-and-right direction in this diagram.

A plurality of light-receiving elements a1 to a4, b1 to b3 arranged in two rows are provided on the light-receiving surface of the detector 12. The reference numeral 20 denotes a slit image formed on this detector 12. The light-receiving elements a1 to a4 are arranged consecutively in the displacement direction of the slit image to form a row (a row of light-receiving elements a1 to a4), and the light-receiving elements b1 to b3 are also arranged consecutively in the displacement direction of the slit image to form a row (a row of light-receiving elements b1 to b3). The row of light-receiving elements a1 to a4 and the row of light-receiving elements b1 to b3 are in contact with each other.

All of the light-receiving elements a1 to a4, b1 to b3 have the same shape and are the same in size. The width dimension D of each of the light-receiving elements a1 to a4, b1 to b3 is set larger than the width dimension W of the slit image 20, and the width dimension D is set smaller than the two times of the width dimension W. The light-receiving elements in the row of light-receiving elements a1 to a4 are arranged to be respectively deviated from the light-receiving elements in the row of light-receiving elements b1 to b3 in the displacement direction of the slit image 20 by half of the width dimension D of each light-receiving element. Thus, the boundary c1 between the light-receiving elements a1, a2, the boundary c2 between the light-receiving elements b1, b2, the boundary c3 between the light-receiving elements a2, a3, the boundary c4 between the light-receiving elements b2, b3 and the boundary c5 between the light-receiving elements a3, a4, which are adjacent to each other in the displacement direction of the slit image 20, are arranged in a zigzag manner from the left to the right in the diagram.

The slit image 20 is adjusted and formed to lie across both of the row of the light-receiving elements a1 to a4 and the row of the light-receiving elements b1 to b3. Thus, in a case where being displaced in the rightward direction in the diagram, the slit image 20 passes through each of the boundaries c1 to c5 in the order of boundaries c1, c2, c3, c4 and c5. In a case where the slit image 20 is displaced in the leftward direction in the diagram, the slit image 20 passes through each of the boundaries c1 to c5 in the order of boundaries c5, c4, c3, c2 and c1. The distance between the boundaries c1, c2, the distance between the boundaries c2, c3, the distance between the boundaries c3, c4 and the distance between the boundaries c4, c5 in the displacement direction of the slit image 20 are respectively shorter than the width W of the slit image 20. Thus, the slit image 20 is always positioned on any of the boundaries c1 to c5 as long as being formed among the light-receiving elements b1 to b3.

Figure 2:
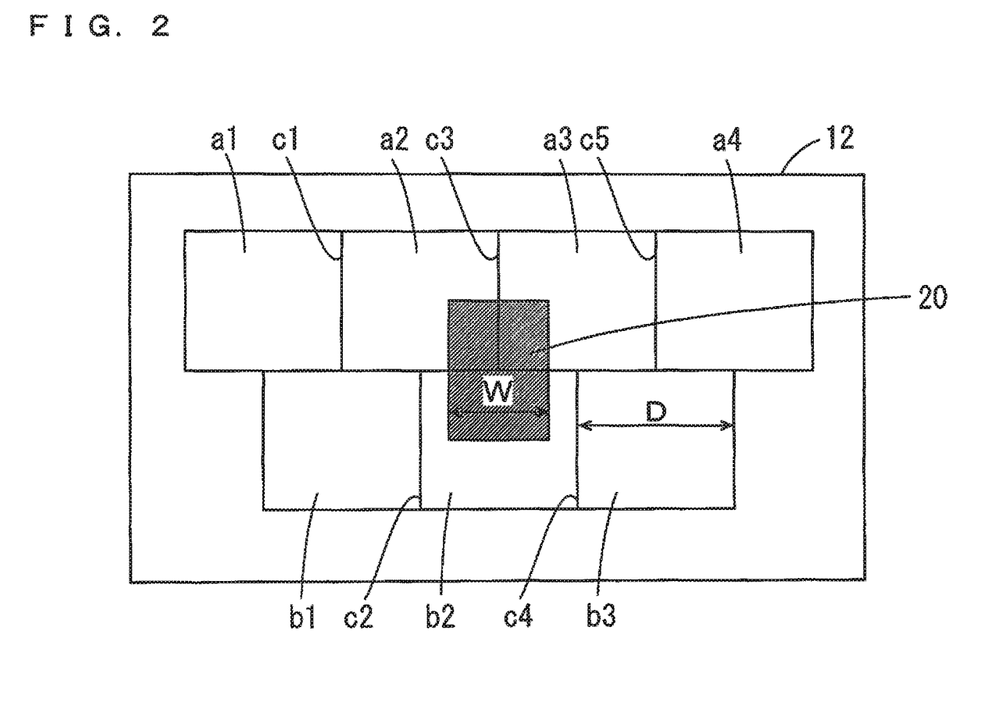
FIG. 2 A plan view of a light-receiving surface of a detector and schematically shows the configuration of a light-receiving element of the detector in the same inventive example.

The slit image 20 is positioned as shown in FIG. 2 in a case where the sample cell 8a and the reference cell 8b of the flow cell 8 have the same refractive indices. In this inventive example, in a case where the sample cell 8a and the reference cell 8b have the same refractive indices, and there is no refraction of the measurement light in the flow cell 8, the center of the slit image 20 is adjusted to be positioned on the boundary c3 between the light-receiving elements a2, a3.

Figure 3:
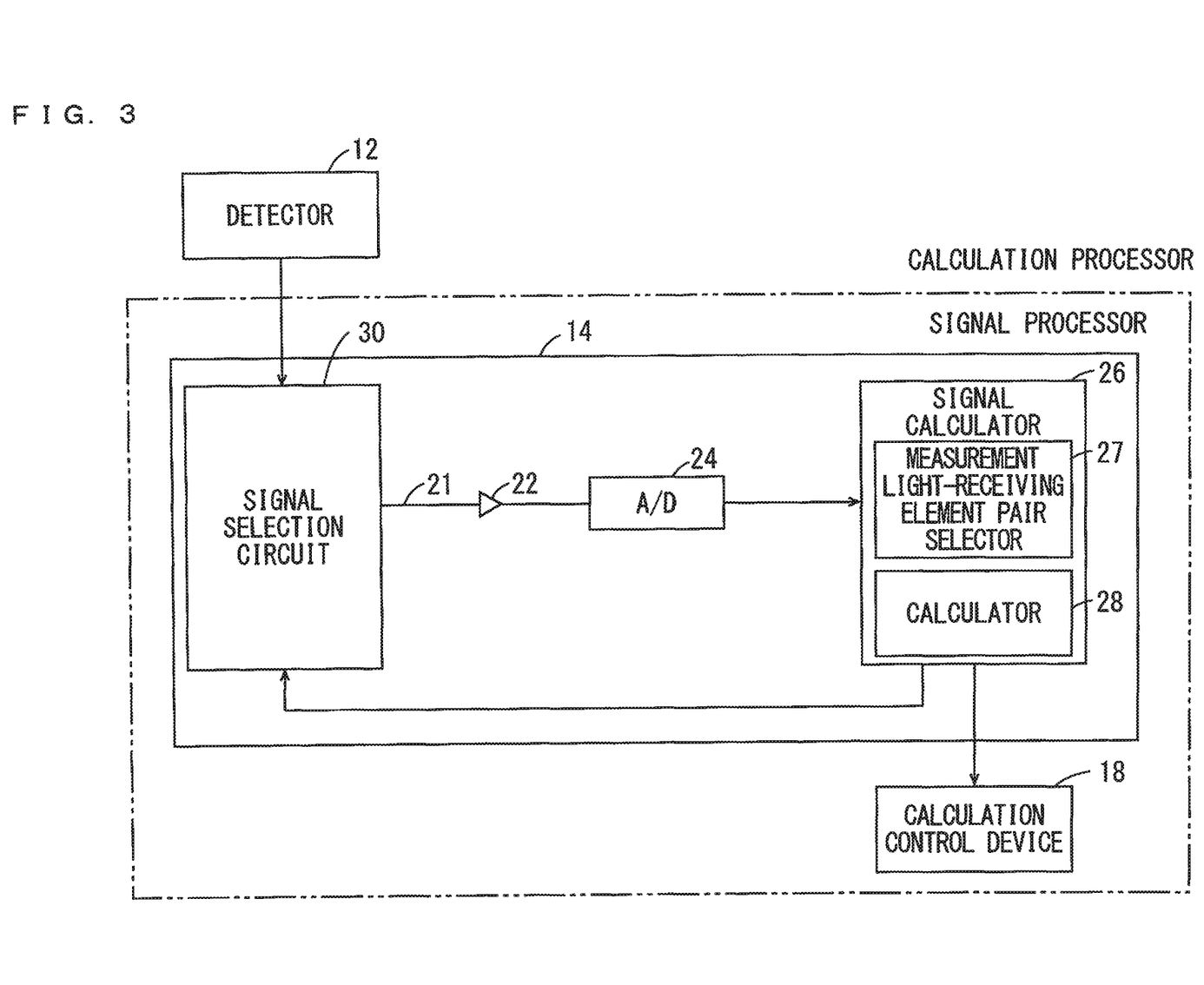
FIG. 3 A block diagram showing the configuration of a signal processor of the same inventive example.

FIG. 3 shows one example of a signal processing system of this differential refractometer.

In this inventive example, the signal processor 14 is provided with a signal selection circuit 30 that selects a light-receiving element from which a detection signal is acquired from among the light-receiving elements a1 to a4, b1 to b3 of the detector 12. This inventive example is configured such that the signal calculator 26 acquires the detection signal of the light-receiving element selected by the signal selection circuit 30 through one signal acquisition system 21. The signal acquisition system 21 includes a preamplifier 22 and an ND (analog/digital) converter 24. A detection signal of any of the light-receiving elements a1 to a4, b1 to b3 is amplified and converted into a digital signal to be input to the signal calculator 26.

The signal calculator 26 includes a measurement light-receiving element pair selector 27 and a calculator 28. The measurement light-receiving element pair selector 27 is configured to select a pair of light-receiving elements constituting a measurement light-receiving element pair based on the detection signal of each of the light-receiving elements a1 to a4, b1 to b3 acquired from the detector 12. The measurement light-receiving element pair is constituted by two light-receiving elements adjacent to each other in one of the row of light-receiving elements a1 to a4 and the row of light-receiving elements b1 to b3, and a slit image 20 is formed on the boundary between the two light-receiving elements. The measurement light-receiving element pair refers to a combination of light-receiving elements used for obtaining the displacement amount of the slit image 20 and the refractive index of the flow cell 8. The calculator 28 is configured to obtain the displacement amount of the slit image 20 and the refractive index of the flow cell 8 using the detection signals of the measurement light-receiving element pair selected by the measurement light-receiving element pair selector 27.

The information in regards to the refractive index of the flow cell 8 obtained by the signal calculator 26 is input to the calculation control device 18. The calculation control device 18 obtains the concentration of the sample solution based on the prepared calibration curve in advance representing the relationship between the refractive index of the flow cell 8 and the concentration of the sample solution, and displays the result on the display 19 (FIG. 1).

Figure 6:
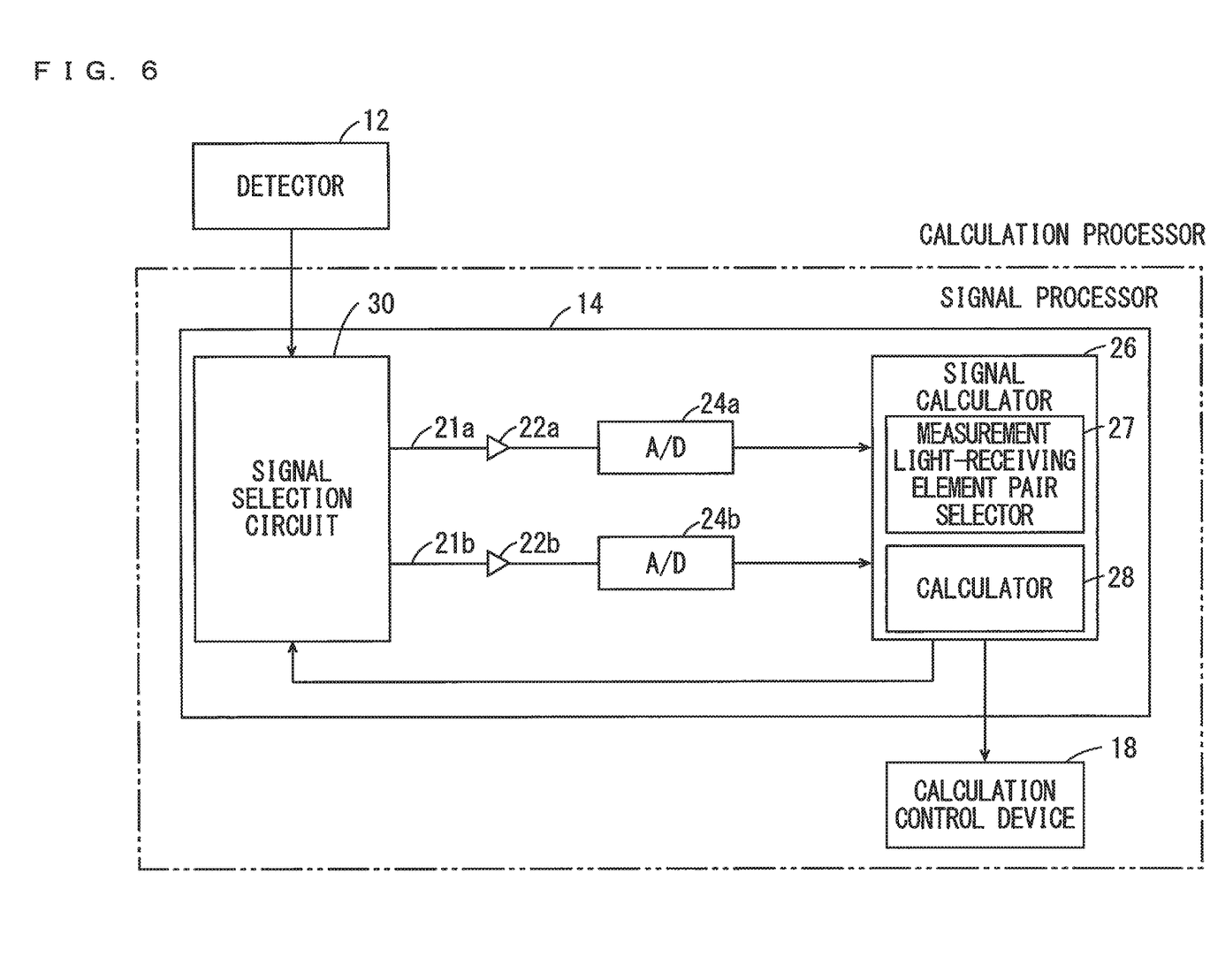
FIG. 6 A diagram schematically showing the configuration of another inventive example of a differential refractometer.

In the configuration of FIG. 3, only one signal acquisition system for acquiring a detection signal from the signal selection circuit 30 and inputting the detection signal to the signal calculator 26 is provided. However, as shown in FIG. 6, two signal acquisition systems 21a, 21b may be provided and simultaneously acquire detection signals of two light-receiving elements constituting a measurement light-receiving element pair in the two signal acquisition systems 21a, 21b. Accordingly, the detection signals of the light-receiving elements used for measurement can be acquired simultaneously, so that it is possible to eliminate the influence such as a time change of a light source.

Although two detection signals of the measurement light-receiving element pair cannot be obtained simultaneously with the configuration of FIG. 3, there is also an advantage that no mechanical error caused by acquiring signals from different signal acquisition systems occurs since a signal is acquired through a single signal acquisition system 21.

Figure 10:
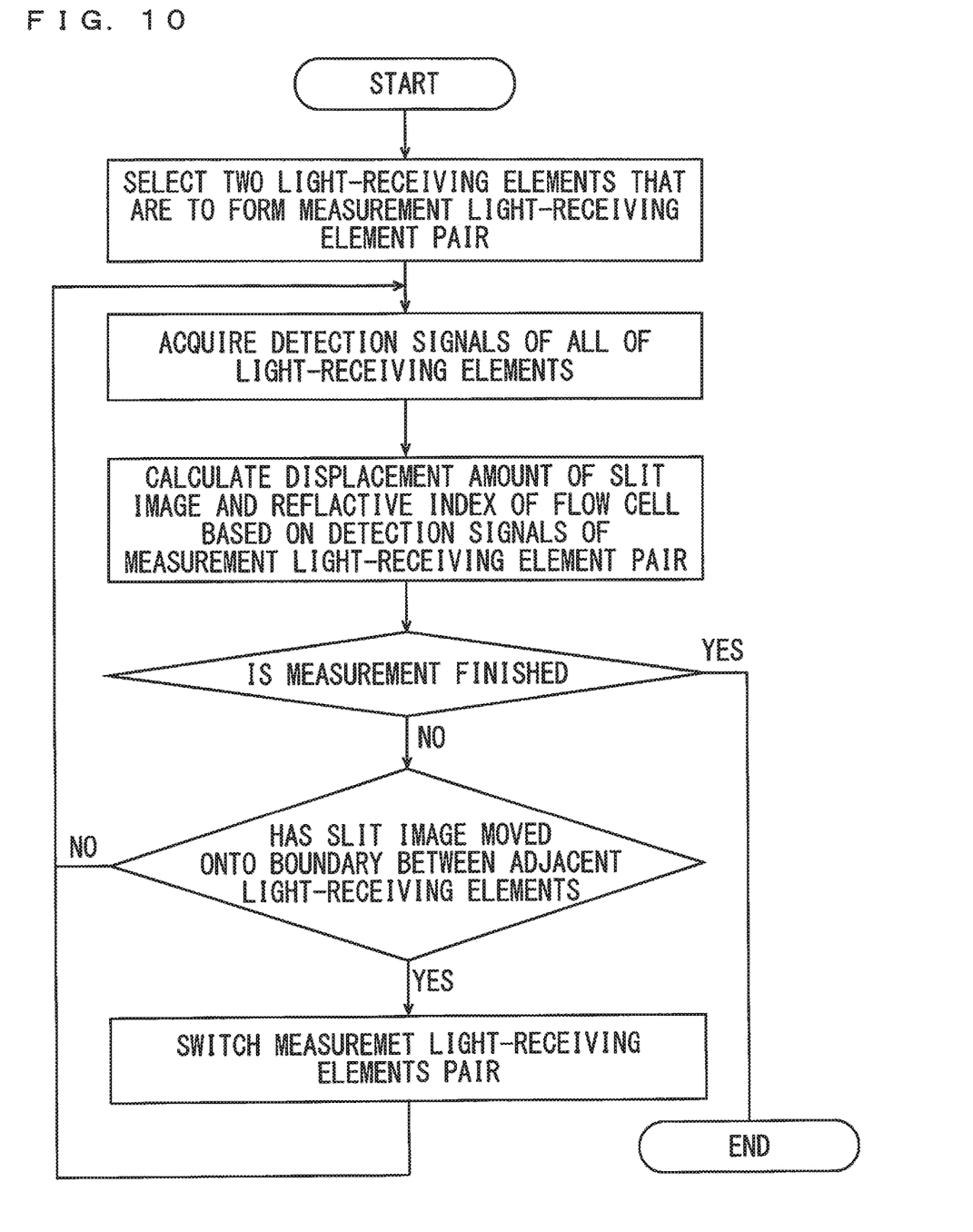
FIG. 10 A flowchart showing a measurement operation of the differential refractometer having the configuration of FIG. 2 or 6.

A signal processing operation at the time of measurement in the above-mentioned inventive example will be described with reference to the flowchart of FIG. 10 as well as FIGS. 2, 4 and 5.

First, two light-receiving elements that are to become a measurement light-receiving element pair are selected at the start of measurement. Since the measurement light is not refracted in the flow cell 8 at the start of measurement, the slit image 20 is positioned on the boundary c3 between the light-receiving elements a2, a3 as shown in FIG. 2. The measurement light-receiving element pair selector 27 may be configured to always set a combination of the light-receiving elements a2, a3 as a measurement light-receiving element pair right after the start of measurement, or may be configured to sequentially acquire the detection signals of all of the light-receiving elements a1 to a4, b1 to b3 right after the start of measurement and set adjacent light-receiving elements a2, a3 from which the detection signals indicating the receipt of measurement light are detected as a measurement light-receiving element pair.

The detection signals of all of the light-receiving elements a1 to a4, b1 to b3 are acquired time-divisionally, the displacement amounts of the slit image 20 are obtained based on the detection signals of the measurement light-receiving element pair (a2, a3) and the refractive indices of the flow cell 8 are successively obtained from the displacement amount. This operation is repeatedly performed until the end of measurement or until the slit image 20 is moved onto the boundary between the next measurement light-receiving element pair. In a case where the slit image 20 continues to be displaced in the rightward direction in the diagram as shown in FIG. 4, the next measurement light-receiving element pair refers to the combination of the light-receiving elements b2, b3 having the boundary therebetween on which the slit image 20 is to be positioned next.

In a case where the light-receiving elements a2, a3 are a measurement light-receiving element pair, the difference between these two signals (a3−a2) is obtained by the calculator 28. Then, the difference (a3−a2) is divided by the addition signal (a3+a2) obtained by adding the two signals, so that (a3−a2)/(a3+a2) is obtained. The displacement amount of the slit image 20 is obtained with use of (a3−a2)/(a3+a2). Thus, the refractive index of the sample solution flowing through the sample cell 8a is obtained. Since the difference signal (a3−a2) between the two signals is divided by the addition signal (a3+a2), it is possible to eliminate the influence such as a change in amount of light in the light source and the influence caused by a change in amount of light received by a light-receiving element due to absorption of a sample. Thus, the measurement accuracy can be improved, and noise can be reduced.

Figure 4:
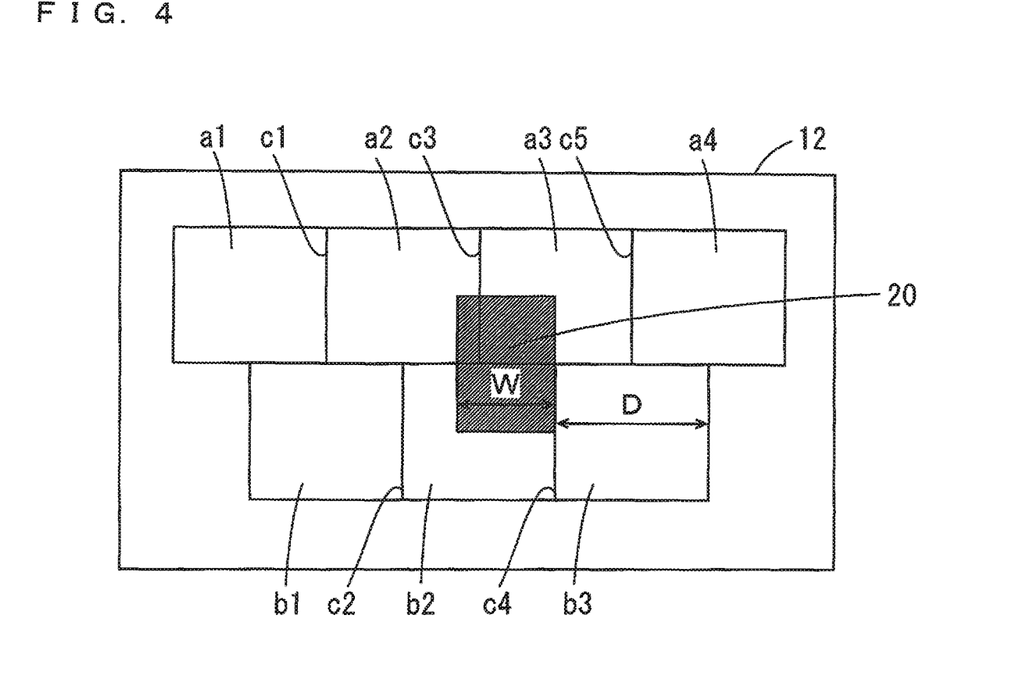
FIG. 4 A plan view of the light-receiving surface of the detector for explaining a slit image being displaced from the state shown in FIG. 2.
Figure 5:
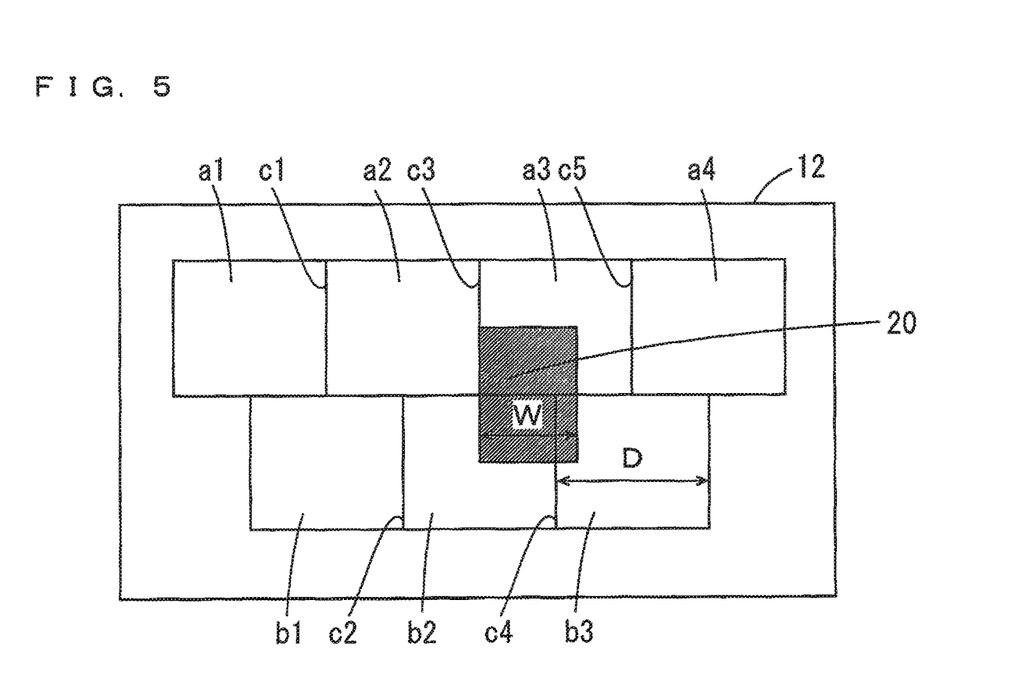
FIG. 5 A plan view of the light-receiving surface of the detector for explaining the slit image being further displaced from the state shown in FIG. 4.

The concentration of the sample solution flowing through the sample cell 8a further changes from the state shown in FIG. 4, and the refractive index of the sample cell 8a changes. When the slit image 20 arrives at the light-receiving element b3 beyond the boundary c4 between the light-receiving elements b2, b3 as shown in FIG. 5, the detection signal indicating the receipt of measurement light is detected from the light-receiving element b3. At this time, the measurement light-receiving element pair selector 27 switches the measurement light-receiving elements to the combination of b2 and b3. Then, the difference (b3−b2) between the detection signals of the light-receiving elements b2, b3 is obtained by the calculator 28, and the difference (b3−b2) is divided by the addition signal (b3+b2). Further, the amount of displacement of the slit image 20 is obtained with use of (b3−b2)/(b3+b2), so that the refractive index of the flow cell 8 is obtained.

In a case where the slit image 20 is further displaced and crosses the boundary c5, the combination of the measurement light-receiving element pair is switched to the combination of a3 and a4. The displacement amount of the slit image 20 and the refractive index of the flow cell 8 are obtained based on the difference between these detection signals. In a case where the slit image 20 continues to be displaced in the leftward direction in FIG. 5 from that state, the combination of the measurement light-receiving element pair is changed to (a3, a4), (b2, b3), (a2, a3), (b1, b2) and (a1, a2) in this order.

The boundary which the slit image 20 crosses next can be estimated based on the change in difference value of the measurement light-receiving element pair over time. For example, in a case where the slit image 20 is displaced from the state of FIG. 2, and the difference (a3−a2) between the detection signals of the measurement light-receiving element pair (a2, a3) is increased, it is found that the slit image 20 is displaced in the rightward direction in the diagram, and that the boundary which the slit image 20 crosses next is c4. Therefore, it is not necessary to monitor the detection signals of all of the light-receiving elements a1 to a4, b1 to b3 time-divisionally as described in the above-mentioned inventive example. The measurement light-receiving element pair can be switched in a timely manner as long as the detection signal of the light-receiving element at which the slit image 20 arrives next after crossing the boundary is monitored.

Figure 7:
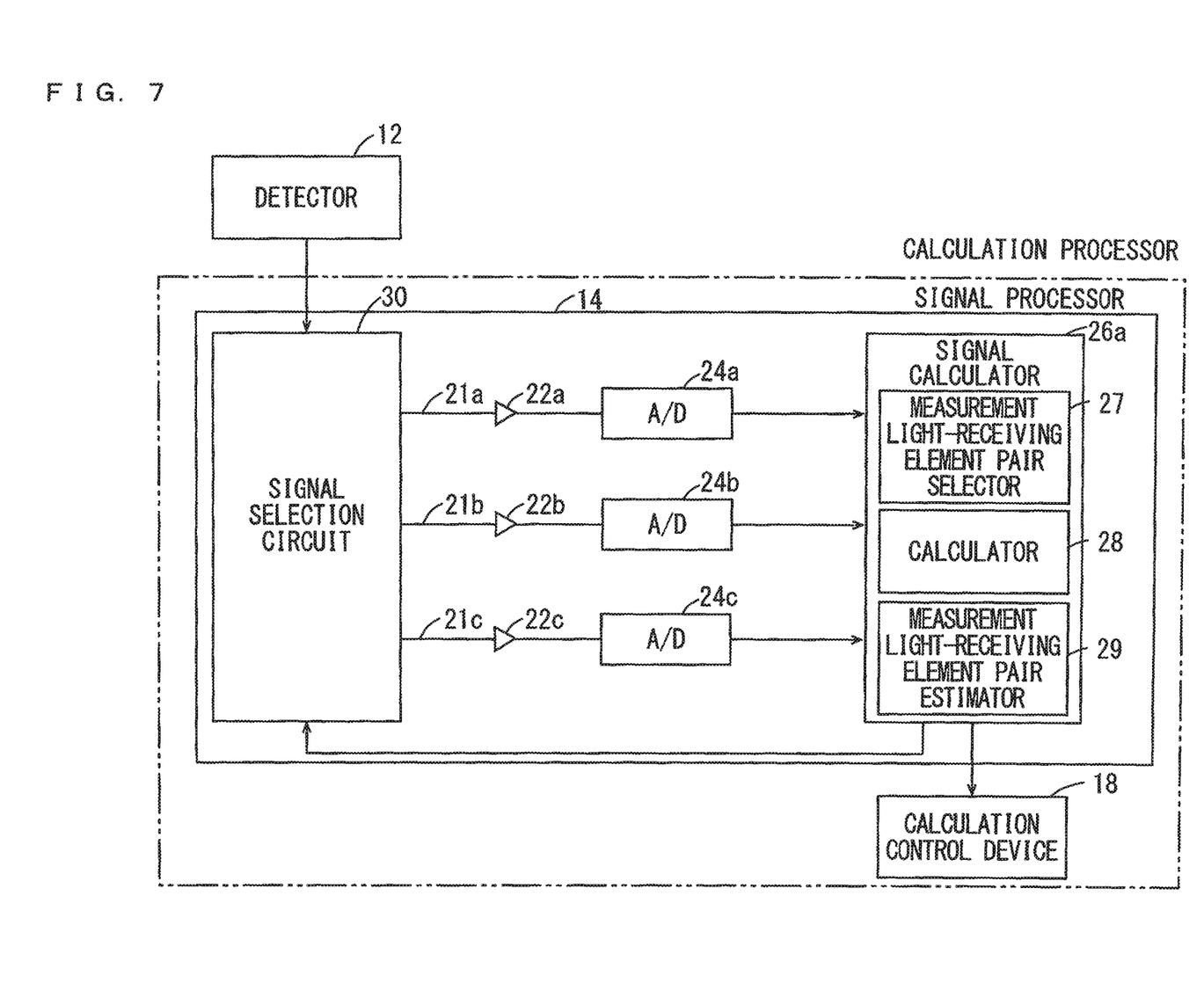
FIG. 7 A diagram schematically showing the configuration of yet another inventive example of a differential refractometer.

One inventive example in which the function of estimating a next measurement light-receiving element pair is included will be described with reference to FIG. 7.

In this inventive example, a signal calculator 26a includes a measurement light-receiving element pair estimator 29, and is configured to detect the displacement direction of a slit image 20 based on the change in difference value between the two detection signals of the measurement light-receiving element pair over time and estimate the combination of two adjacent light-receiving elements having the boundary therebetween on which the slit image 20 will be positioned next, that is, a next measurement light-receiving element pair.

A signal processor 14 includes three signal acquisition systems 21a to 21c as a signal acquisition system for acquiring a detection signal from a signal selection circuit 30 and inputting the detection signal to a signal calculator 26a. Two signal acquisition systems 21a, 21b out of the three signal acquisition systems 21a to 21c are used to acquire two detection signals of the measurement light-receiving element pair selected by the measurement light-receiving element pair selector 27. The remaining one signal acquisition system 21c is used to acquire a detection signal of the light-receiving element at which the slit image 20 arrives next after crossing the boundary due to the displacement of the slit image 20. For example, in a case where the slit image 20 is displaced in the rightward direction in the diagram from the state of FIG. 2, the detection signal of a light-receiving element b3 is acquired through the signal acquisition system 21c to be monitored. When the detection signal indicating the receipt of measurement light is detected from the light-receiving element b3, the measurement light-receiving element pair selector 27 switches the combination of the measurement light-receiving element pair from (a2, a3) to (b2, b3). With this configuration, the two detection signals of a measurement light-receiving element pair are constantly acquired from the two signal acquisition systems 21a, 21b. Thus, accurate measurement can be carried out without being influenced by a change in light source over time and the like. Further, since the detection signals of light-receiving elements constituting a measurement light-receiving element pair next can be constantly monitored, the measurement light-receiving element pair can be switched accurately in a timely manner.

Figure 8:
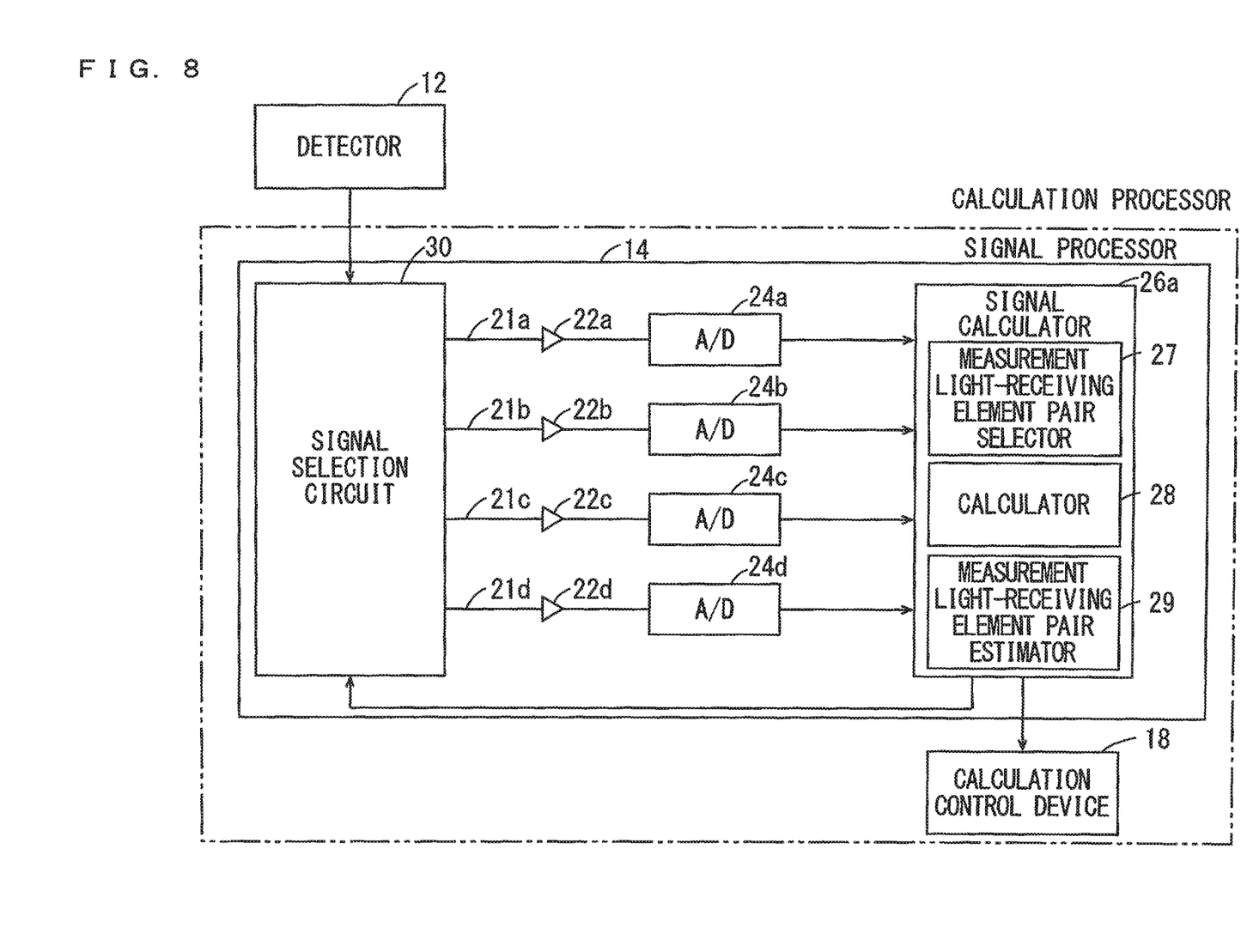
FIG. 8 A diagram schematically showing the configuration of yet another inventive example of a differential refractometer.

Further, as shown in FIG. 8, four signal acquisition systems 21a to 21d may be included as a signal acquisition system for acquiring a detection signal from the signal selection circuit 30 and inputting the detection signal to the signal calculator 26a. The two signal acquisition systems 21a, 21b may be used to acquire two detection signals of the measurement light-receiving element pair selected by the measurement light-receiving element pair selector 27, and the remaining two signal acquisition systems 21c, 21d may be used to acquire the detection signals of two light-receiving elements estimated to become a measurement light-receiving element pair next. This enables the detection signals of the two light-receiving elements that are to become a measurement light-receiving element pair next to be monitored in advance.

Figure 11:
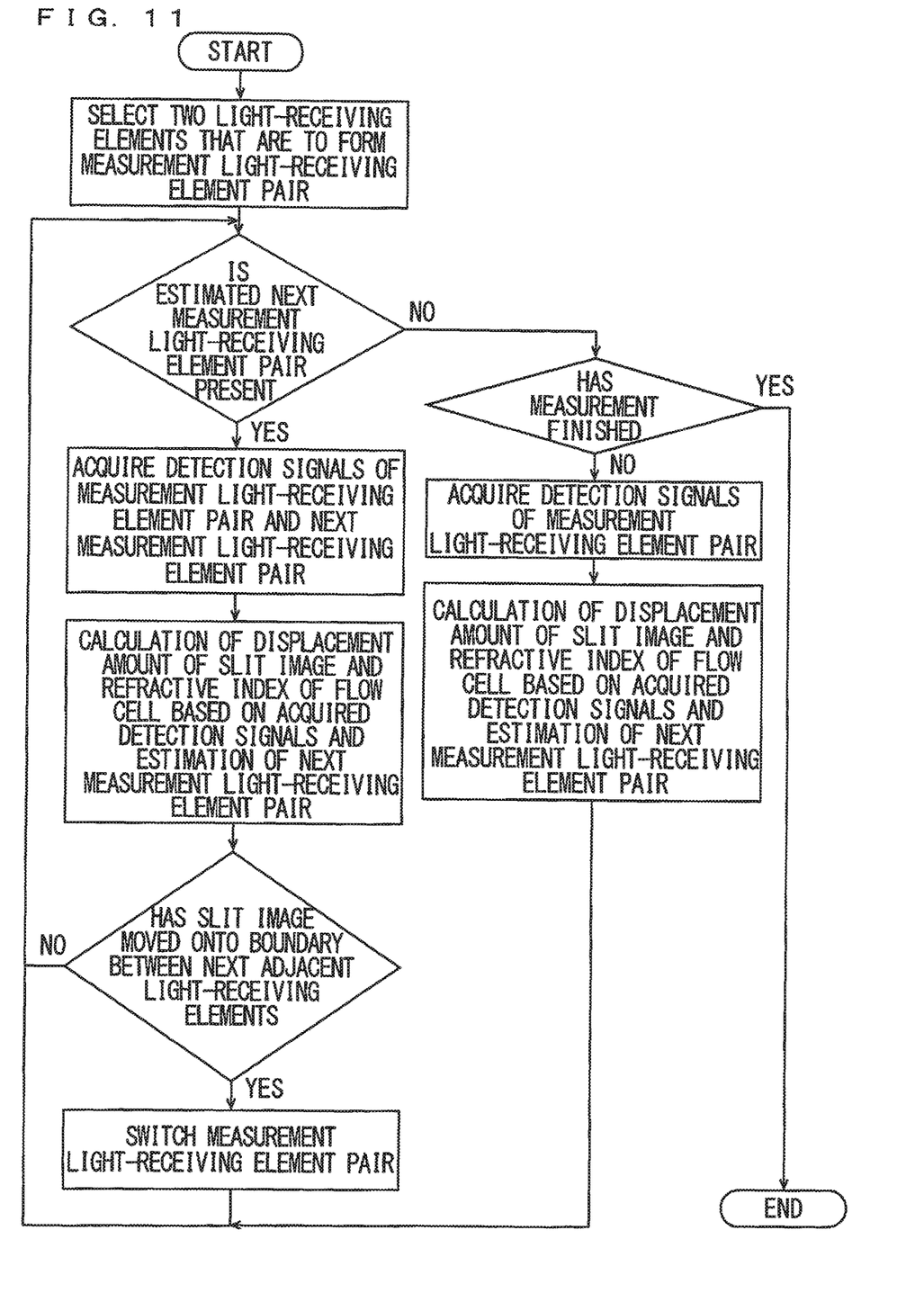
FIG. 11 A flow chart showing a measurement operation of the differential refractometer having the configuration of FIG. 7 or 8.

The measurement operation of the differential refractometer having the configuration shown in FIG. 7 or 8 will be described with reference to the flow chart shown in FIG. 11.

First, two light-receiving elements that are to become a measurement light-receiving element pair are selected at the start of measurement. Since the measurement light is not refracted in the flow cell 8 at the start of measurement, the slit image 20 is positioned on the boundary c3 between the light-receiving elements a2, a3 as shown in FIG. 2. The measurement light-receiving element pair selector 27 may be configured to always set the combination of the light-receiving elements a2, a3 as a measurement light-receiving element pair right after the start of measurement, or may be configured to sequentially acquire the detection signals of all of the light-receiving elements a1 to a4, b1 to b3 right after the start of measurement and set adjacent light-receiving elements a2, a3 from which the detection signals indicating the receipt of measurement light are detected as a measurement light-receiving element pair.

While the direction in which the slit image 20 is displaced cannot be detected right after the start of measurement, it is possible to estimate light-receiving elements that are to become a measurement light-receiving element pair next by detecting the direction in which the slit image 20 is displaced thereafter. In a case where the slit image 20 continues to be displaced in the rightward direction in the diagram, the light-receiving elements that are to become a light-receiving element pair next are b2 and b3. In a case where the light-receiving elements a2, a3 are a measurement light-receiving element pair, the detection signals of these light-receiving elements a2, a3 are acquired at intervals of certain period of time, and the calculator 28 calculates the difference (a3−a2) between these two signals. Then, the difference (a3−a2) is divided by an addition signal (a3+a2) obtained by adding the two signals, so that (a3−a2)/(a3+a2) is obtained. The displacement amount of the slit image 20 is obtained with use of (a3−a2)/(a3+a2). Thus, the refractive index of the sample solution flowing through the sample cell 8a is obtained. At the same time, the detection signals of the light-receiving elements b2, b3, which are to become a measurement light-receiving element pair next, are also acquired time-divisionally to be monitored. With the configuration of FIG. 7, only the detection signal of the light-receiving element b3 may be acquired at intervals of certain period of time to be monitored.

As shown in FIG. 4, when the slit image 20 arrives at the light-receiving element b3 beyond the boundary c4 between the light-receiving elements b2, b3 that are the next measuring light-receiving element pair, the detection signal indicating the receipt of the measurement light is detected from the light-receiving element b3. Thus, the measurement light-receiving element pair selector 27 switches the measurement light-receiving element pair to the combination of b2 and b3. Then, detection signals of these light-receiving elements b2, b3 are acquired at intervals of certain period of time. The difference (b3−b2) between the detection signals of these light-receiving elements b2, b3 are calculated by the calculator 28. The displacement amount of the slit image 20 and the refractive index of the flow cell 8 are obtained with use of the value obtained when the difference (b3−b2) is divided by the addition signal (b3+b2). At this time, the displacement direction of the slit image 20 is detected based on the change in difference (b3−b2) between the detection signals over time, and the combination of the light-receiving elements to become a measurement light-receiving element pair next is estimated. In a case where the slit image 20 is further displaced in the rightward direction in FIG. 4, the light-receiving elements a3, a4 are estimated to be the next measurement light-receiving element pair, and their detection signals are acquired at intervals of certain period of time to be monitored. Thereafter, the process is repeatedly performed until the measurement of a sample ends.

Figure 9:
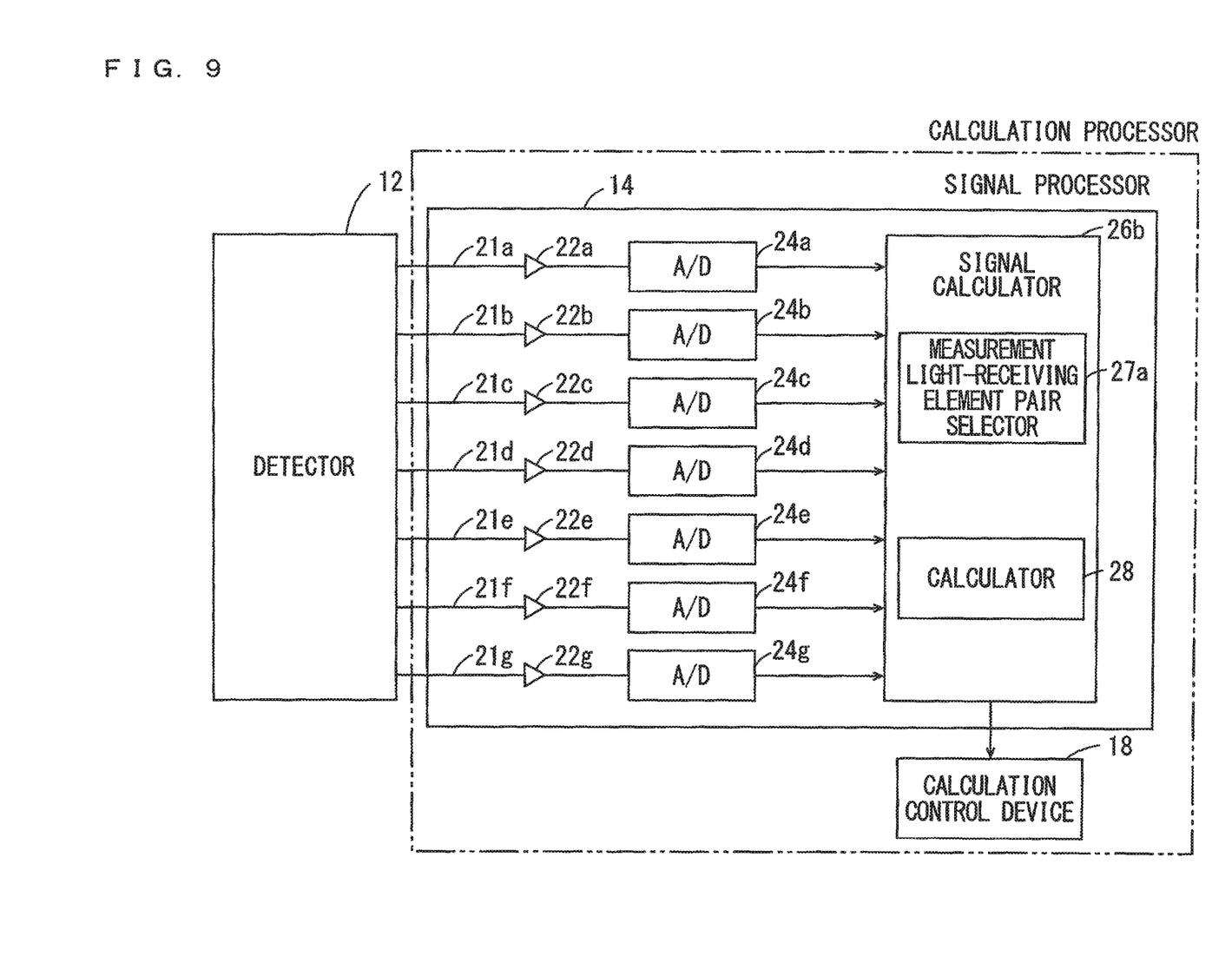
FIG. 9 A diagram schematically showing the configuration of yet another inventive example of a differential refractometer.

While the detection signals of the light-receiving elements a1 to a4, b1 to b3 of the detector 12 are selectively input to the signal calculators 26, 26a through the signal selection circuit 30 in the inventive example mentioned above, the present invention is not limited to this. As shown in FIG. 9, the detection signals of all of the light-receiving elements a1 to a4, b1 to b3 of the detector 12 may be directly input to the signal calculator 26b through respective signal input systems 21a to 21g.

DESCRIPTION OF REFERENCE NUMERALS

2 Light Source
4 Slit
6 Lens
8 Flow Cell
8a Sample cell
8b Reference Cell
10 Reflection Mirror
12 Detector
14 Signal Processor
16 Controller
18 Calculation Control Device
19 Display
20 Slit Image
21, 21a to 21g Signal Input Systems
22, 22a to 22g Preamplifiers
24, 24a to 24g A/D Converters
26, 26a, 26b Signal Calculators
27, 27a Measurement Light-receiving Element Pair Selectors
28 Calculator
a1, a2, a3, a4, b1, b2, b3 Light Receiving Elements
c1 to c5 Boundary Between Adjacent Light-Receiving Elements

The invention claimed is:
1. A differential refractometer comprising:
a light source that generates measurement light;
a flow cell that is provided with a sample cell through which a sample solution flows, a reference cell for a reference solution and a partition wall provided between the sample cell and the reference cell, and refracts the light from the light source in a case where a refractive index of the sample cell and a refractive index of the reference cell are different from each other;
an optical system that irradiates the flow cell with the measurement light from the light source, causes the measurement light to be transmitted through the sample cell and the reference cell of the flow cell, and causes a slit image of the measurement light that has been transmitted through the flow cell to be formed; and
a detector that includes a light-receiving surface at a position at which the slit image of the measurement light that has been transmitted through the flow cell is formed, wherein
the differential refractometer is configured such that the slit image is displaced in a certain direction on the light-receiving surface according to a change in refractive index of the sample cell,
the detector includes two light-receiving element rows in which a plurality of light-receiving elements are consecutively arranged in a displacement direction of the slit image on the light-receiving surface,
a width of the light-receiving element in the displacement direction is larger than a width of the slit image and smaller than two times of the slit width,
a boundary between adjacent light-receiving elements in one light-receiving element row is deviated from a boundary between adjacent light-receiving elements in another light-receiving element row and closest to the boundary by a distance smaller than the width of the slit image in the displacement direction,
the slit image is set to be formed and extend to both of light-receiving element rows, and
the differential refractometer includes
a measurement light-receiving element pair selector configured to select a pair of light-receiving elements, which are adjacent to each other in any one of the light-receiving element rows and has a boundary between the pair of light-receiving elements and on which a slit image is formed, out of the light-receiving elements of the detector, and
a calculator configured to acquire detection signals of the measurement light-receiving element pair and obtain a displacement amount of the slit image based on a difference between the detection signals of these light-receiving elements.

2. The differential refractometer according to claim 1, wherein
the measurement light-receiving element pair selector is configured to regularly acquire detection signals from all of the light-receiving elements of the detector, and select a pair of light-receiving elements as a new measurement light-receiving element pair in a case where detecting formation of the slit image on a boundary between the pair of adjacent light-receiving elements different from a pair of currently selected light-receiving elements from a detection signal, during measurement.

3. The differential refractometer according to claim 1, further comprising a measurement light-receiving element pair estimator configured to estimate a pair of light-receiving elements to be selected as the measurement light-receiving element pair next based on a change in displacement amount of the slit image over time, the change being obtained by the calculator during measurement, wherein the measurement light-receiving element pair selector is configured to regularly acquire detection signals of a pair of light-receiving elements estimated by the measurement light-receiving element pair estimator, and select the pair of light-receiving elements as a new measurement light-receiving element pair in a case where detecting presence of the slit image on a boundary between the pair of light-receiving elements from a detection signal, during the measurement.

4. The differential refractometer according to claim 1, wherein the calculator is configured to use a value obtained when a difference value between detection signals of the light-receiving elements constituting the measurement light-receiving element pair is divided by an addition value of these detection signals for calculation of a displacement amount of the slit image.

\* \* \* \* \*